US 6,694,065 B2

(12) United States Patent
Kobara et al.

(10) Patent No.: US 6,694,065 B2
(45) Date of Patent: Feb. 17, 2004

(54) IMAGE COLLATING APPARATUS AND IMAGE COLLATING METHOD

(75) Inventors: Katsutoshi Kobara, Kawasaki (JP); Shinichi Eguchi, Kawasaki (JP); Kouichi Kamamoto, Kawasaki (JP); Maki Yabuki, Kawasaki (JP); Koichi Chiba, Kawasaki (JP); Toshiyuki Waida, Kawasaki (JP); Kazunori Yamamoto, Kawasaki (JP); Yutaka Katsumata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 536 days.

(21) Appl. No.: 09/733,077

(22) Filed: Dec. 11, 2000

(65) Prior Publication Data

US 2001/0021270 A1 Sep. 13, 2001

(30) Foreign Application Priority Data

Mar. 10, 2000 (JP) ........................................ 2000-067516

(51) Int. Cl.$^7$ .............................. G06K 9/60; G06K 9/78

(52) U.S. Cl. ........................ 382/305; 382/286; 382/297; 382/298

(58) Field of Search ................................. 382/305–306, 382/217, 218, 286, 298, 297, 190, 181; 358/403; 707/6

(56) References Cited

U.S. PATENT DOCUMENTS

| 4,468,755 A | * | 8/1984 | Iida ............................ 345/668 |
| 5,093,873 A | * | 3/1992 | Takahashi .................. 382/306 |
| 5,991,466 A | * | 11/1999 | Ushiro et al. ............... 382/305 |
| 6,345,275 B2 | * | 2/2002 | Lee ............................... 707/6 |

FOREIGN PATENT DOCUMENTS

| JP | 2-23491 | 1/1990 |
| JP | 5-67189 | 3/1993 |
| JP | 9-245099 | 9/1997 |
| JP | 11-143986 | 5/1999 |

* cited by examiner

Primary Examiner—Jon Chang
(74) Attorney, Agent, or Firm—Staas & Halsey LLP

(57) ABSTRACT

An image collating apparatus and an image collating method, in which a document larger than an image reader can be collated using a preregistered image even in the case where the document is read by the image reader, are disclosed. The image of the document read by the image reader is collated sequentially with the document images of different sizes preregistered in a data base. The document size is determined from the document image input from the image reader. In the case where the document size is smaller than the preregistered image size, the preregistered image is retrieved in accordance with the document size, so that the document features are extracted and matched between the read document image and the registered image set in size to each other, thereby collating the read image with the preregistered image.

12 Claims, 17 Drawing Sheets

(APPLICATION FORM IN NORMAL UPRIGHT POSITION)

(APPLICATION FORM UPSIDE DOWN)

《A4 SIZE (READ IMAGE)》

《A3 SIZE (PREREGISTERED IMAGE)》

《IMAGE BEFORE SEGMENTATION》

《IMAGE AFTER SEGMENTATION (RETRIEVAL)》

Fig. 9A

VOUCHER A / END OF APPLICATION FORM

- HORIZONTAL RULED LINE 1
- HORIZONTAL RULED LINE 2
- HORIZONTAL RULED LINE 3
- HORIZONTAL RULED LINE 4
- HORIZONTAL RULED LINE 5
- VERTICAL RULED LINE 1
- VERTICAL RULED LINE 2
- VERTICAL RULED LINE 3

VOUCHER A / END OF APPLICATION FORM

Fig.10A

APPLICATION FORM END

ACCOUNT TRANSFER NOTICE      Jan.10,2000

| | |
|---|---|
| FUJITSU BANK, MAIN OFFICE<br><br>DEMAND DEPOSIT No.1002456 | TRANSFER AMOUNT: 100,000YEN |
| Mr.FUJITSU,TARO | |

ABC TRADING COMPANY,Ltd.

Fig.10B

APPLICATION FORM END

ACCOUNT TRANSFER NOTICE            Jan.10,2000

FUJITSU BANK, MAIN OFFICE    TRANSFER AMOUNT: 100,000YEN

DEMAND DEPOSIT No.1002456

Mr.FUJITSU,TARO

ABC TRADING COMPANY, Ltd.

Fig. 10C

APPLICATION FORM END

ACCOUNT TRANSFER NOTICE

ABC TRADING COMPANY, Ltd.

《 A4 SIZE (READ IMAGE) 》

《 IMAGE BEFORE SEGMENTATION 》

《 IMAGE AFTER SEGMENTATION (RETRIEVAL) 》

IMAGE COLLATING APPARATUS AND IMAGE COLLATING METHOD

BACKGROUND OF THE INVENTION

1. Field of the Invention

The present invention relates to an image collating apparatus and an image collating method or, in particular, to an image collating apparatus and an image collating method in which a transfer application form (hereinafter sometimes referred to as the application form) is read by an image reader and collated with a plurality of types of transfer application forms preregistered in a transfer organization.

2. Description of the Related Art

Conventionally, a transfer application form having three vouchers is used for payment of the municipal taxes and the public utilities charges such as city gas, water and electricity. The three vouchers are separable by perforation. For example, the left voucher is used as a receipt of the money paid by a person at the window of a bank or a post office, the middle voucher is held by a transfer organization (bank or post office) and the right voucher is sent to a payee organization.

The transfer application form submitted to the window of a bank, etc. is read by an image reader for discrimination of the type thereof. For this purpose, the transfer organization such as the bank has a data base in which various types of transfer application forms issued by the municipalities and public bodies are preregistered for collation with a particular transfer application form. If the type of a transfer application form is identified by the image reader or, for example, it is determined that the transfer application form is issued by City A for transfer of a tax, the definition information for recognizing the characters of City A is read from the data base. The portion describing the amount in the transfer application form of City A is recognized, displayed on a display unit and checked by the teller.

The image reader of the transfer application form recognition system for reading the transfer application form at the window of the bank or the like is not installed for the sole purpose of reading such an application form but for various purposes. Also, the image reader is mainly designed for reading vertically-long documents of A4 size.

The application forms, however, include larger ones that cannot be read by the image reader used for reading a vertically-long A4-sized application forms. The teller is required to take the trouble of bringing such a larger application form to an image reader for A3-sized application forms, and it is desired to improve the image reader to handle this problem.

SUMMARY OF THE INVENTION

The object of the present invention is to provide an image collating apparatus and an image collating method, in which an application form can be collated accurately either in the case where the application form is read by an image reader capable of reading only a part of the application form in a transfer organization having a data base with the image of the whole application form preregistered for collation, or in the case where the application form is read by an image reader capable of reading the whole of the application form in a transfer organization having a data base with the image of only a part of the application form preregistered for collation.

In order to achieve the objects described above, according to one aspect of the invention, there is provided an image collating apparatus for determining the type of a document in such a manner that the image of the particular document read by a plurality of image readers having different reading sizes connected to an image input unit of the apparatus is sequentially collated with a plurality of document images preregistered in a data base, the apparatus comprising a preregistered image reading circuit, a document size determination processing circuit, an image retrieval circuit, a feature extraction processing circuit, an image collation processing circuit and a document determination circuit. The preregistered image reading circuit sequentially reads the document images preregistered in the data base. The document size determination processing circuit determines the size of a document by detecting the ends of the document from the document image input from the image readers. The image retrieval circuit operates in such a manner that, in the case where the document size that has been read is smaller than the size of the preregistered image, the preregistered image that has been read is retrieved in accordance with the document size that has been read, while in the case where the document size that has been read is larger than the size of the preregistered image, on the other hand, the document image that has been read is retrieved from one direction in accordance with the size of the preregistered image, so that the size of the document image that has been read is set to the size of the preregistered image. The feature extraction processing circuit extracts the feature of the document from the document image of which the size is set to the size of the preregistered image by the image retrieval circuit. In the feature collation processing circuit, the feature of the document extracted is matched sequentially with the features of the preregistered images of which the size is set to the size of the document image by the image retrieval circuit. In the case where the feature of the document coincides with the feature of a preregistered image, the type of the document is determined from the particular preregistered image.

The apparatus can further comprise an image rotating circuit, wherein in the case where the feature of the document fails to coincide with the features of all the documents preregistered in and read from the data base, the preregistered image is sent to the image retrieval circuit after being rotated by a multiple of 90 degrees.

In order to achieve the object described above, according to another aspect of the invention, there is provided an image collating method for an image collating apparatus for determining the type of a document in such a manner that the image of the particular document read by a plurality of image readers having different reading sizes connected to an image input unit of the apparatus is sequentially collated with a plurality of document images preregistered in a data base, wherein the type of the document is determined in such a manner that the document images preregistered in the data base are sequentially read, the document size is determined by detecting the document ends from the document image input from the image readers, and in the case where the document size that has been read is smaller than the size of the preregistered image, the preregistered image that has been read is retrieved in accordance with the document size, while in the case where the document size that has been read is larger than the size of the preregistered image, the document image that has been read is retrieved from one direction in accordance with the size of the preregistered image, the feature of the document is extracted from the document image, the document feature extracted is sequentially matched with the features of the document images, and in the case where the features of the two images coincide with each other, the document type is determined from the particular preregistered image.

In the image collating apparatus and the image collating method according to this invention, a document is collated and the document type can be determined simply by pre-registering the documents of predetermined image sizes in a data base, reading a part or the whole of the document by image readers of any size and comparing the feature of the document with that of the preregistered images.

BRIEF DESCRIPTION OF THE DRAWINGS

The present invention will be more clearly understood from the description as set forth below with reference to the accompanying drawings, wherein:

FIG. 9A is a diagram for explaining the ruled line information of the application form that has been read;

FIG. 9B is a pattern diagram showing the types of meeting points;

FIG. 9C is a diagram showing the meeting points extracted from the ruled lines shown in FIG. 9A;

FIG. 10A is a diagram showing the state in which the character information and the ruled lines are extracted from the image of the application form that has been read;

FIG. 10B is a diagram showing the state in which the character size labels are extracted by deleting the ruled line information from the application form image shown in FIG. 10A;

FIG. 10C is a diagram showing the state in which only the feature character labels are extracted from the character size labels shown in FIG. 10B;

DESCRIPTION OF THE PREFERRED EMBODIMENTS

Before describing the preferred embodiments, an explanation will be given of the conventional image collating apparatus and the conventional image collating method shown in FIGS. 1A to 2C.

Figure 1A:
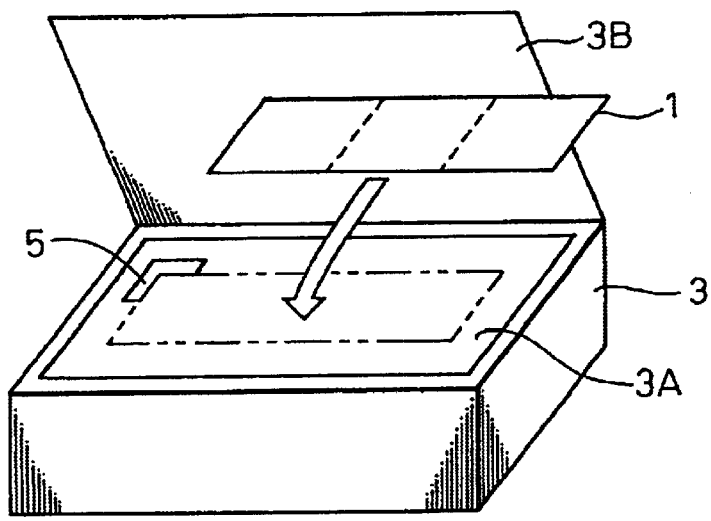
FIG. 1A is a perspective view of the conventional A3-sized image reader and a transfer application form.

FIG. 1A is a diagram showing the manner in which an application form 1 is read by the conventional A3-sized image reader 2. The glass surface 3A of the A3-sized image reader 3 for reading an image is formed with a guide 5 with which a corner of the document to be imaged is brought into contact to set the document in position. The application form 1 is placed on the glass surface 3A with the upper left corner thereof brought into contact with the guide 5. This A3-sized image reader 3, when switched on after a cover 3B is closed, reads the transfer application form 1.

Figure 1B:
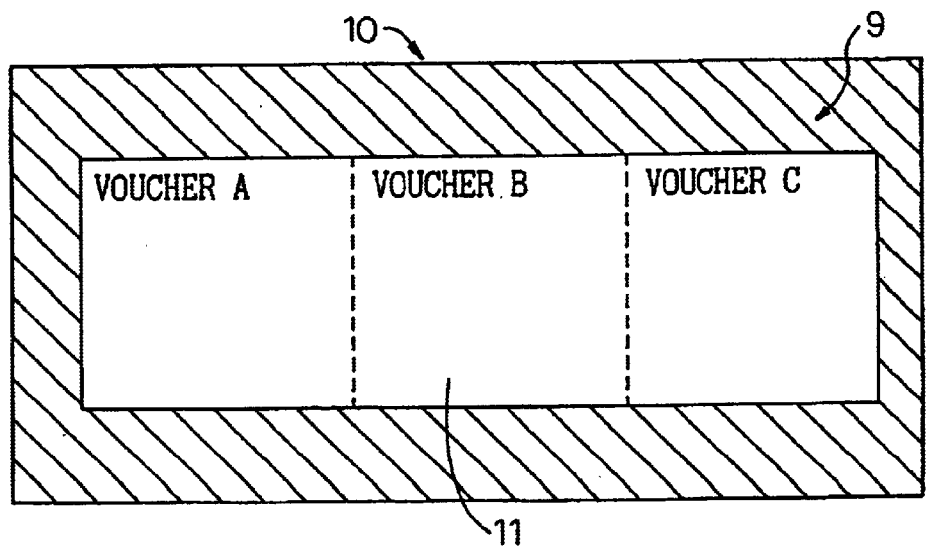
FIG. 1B is a diagram showing an image of the application form read by the image reader of FIG. 1A.

FIG. 1B shows an image 10 read by the image reader 3 of FIG. 1A. The glass surface 3A of the A3-sized image reader 3 is so large that the whole (including three vouchers A, B and C) of even the large-sized application form 1 large can be read. The image 10 thus read is configured with an application form image 11 and the surrounding black background 9. This example shows the normal upright position of the application form image read by the image reader 3. In the case where the application form 1 is read upside-down, however, the application form image 11 is also produced upside-down.

Figure 2A:
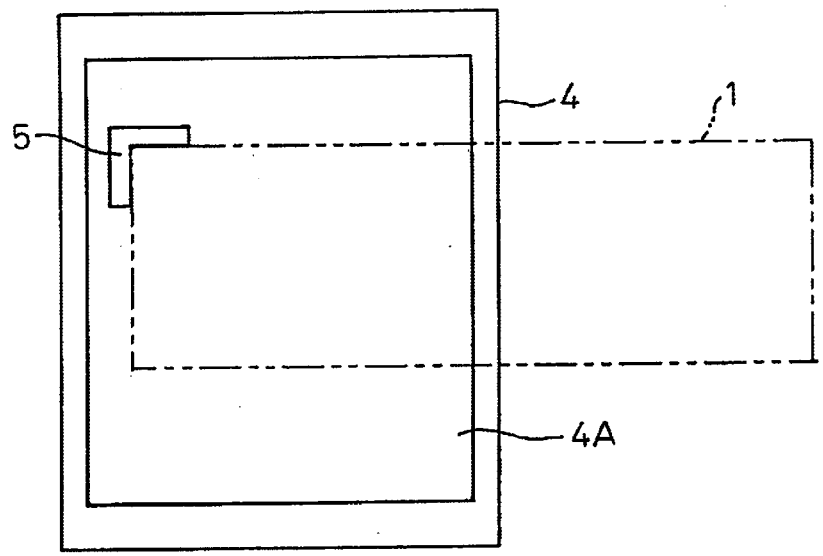
FIG. 2A is a plan view of the conventional A4-sized image reader.

On the other hand, FIG. 2A shows the case in which the application form 1 of the size shown in FIG. 1A is read by the conventional A4-sized image reader 4. A guide 5 is formed also on the glass surface 4A of the A4-sized image reader 4. In the case where an application form 1 larger in size than the A4-sized image reader is read using the A4-sized image reader 4, the application form 1, of course, partially extends out of the A4-sized image reader 4.

Figure 2B:
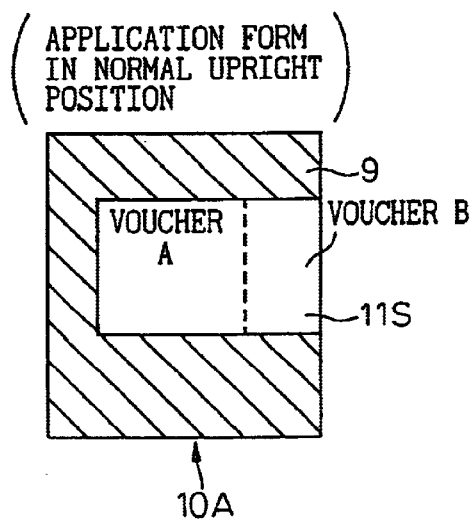
FIG. 2B is a diagram showing an image of the application form in a normal upright position read by the image reader of FIG. 2A.
Figure 2C:
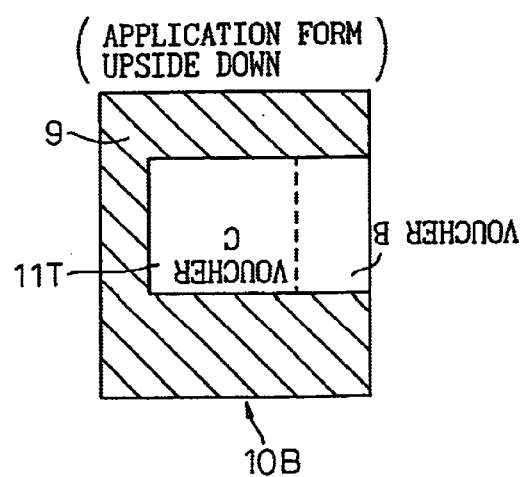
FIG. 2C is a diagram showing an image of the application form in an upside-down position read by the image reader of FIG. 2A.

FIG. 2B shows an image 10A of the application form 1 in normal upright position read by the A4-sized image reader 4 shown in FIG. 2A. The image 10A thus read is configured with an image 10A of the application form 1 in normal upright position and a black background 9. FIG. 2C, on the other hand, shows an image 10B of the application form 1 read upside-down by the A4-sized image reader 4 of FIG. 2A. The image 10B thus read is configured with an image 11T of the application form 1 upside down and a black background 9.

In the case where the application form 1 of a size partially extending out of the A4-sized image reader 4 is read by the A4-sized image reader 4 as described above, the whole application form 1 cannot be read but the left or right end of the application form 1 is cut off from the image thereof depending on the direction in which the application form 1 is read. In such a case, as long as the image of the parts of the application form is preregistered for collation in the data base of the organization in charge of the collation of the application form, the application form can be successfully collated by matching the features of the particular parts. In the case where the image of the whole application form is preregistered for collation, however, the problem is that the features of the application form as a whole cannot be matched, thereby making the collation of the application form impossible.

In view of this, according to this invention, there are provided an image collating apparatus and an image collating method, in which an application form can be accurately collated, both in the case where only a part of the application form is read by the image reader of the image collating apparatus with the whole application form image preregistered therein for collation and in the case where the image of the whole application form is read by the image reader of the image collating apparatus with a partial application form image preregistered therein for collation.

The image collating apparatus according to this invention is adapted to identify a document by collating it with the images of the contents of various documents preregistered in the data base. For simplicity's sake, however, the explanation below will be given of an embodiment in which the document is a transfer application form.

Figure 3:
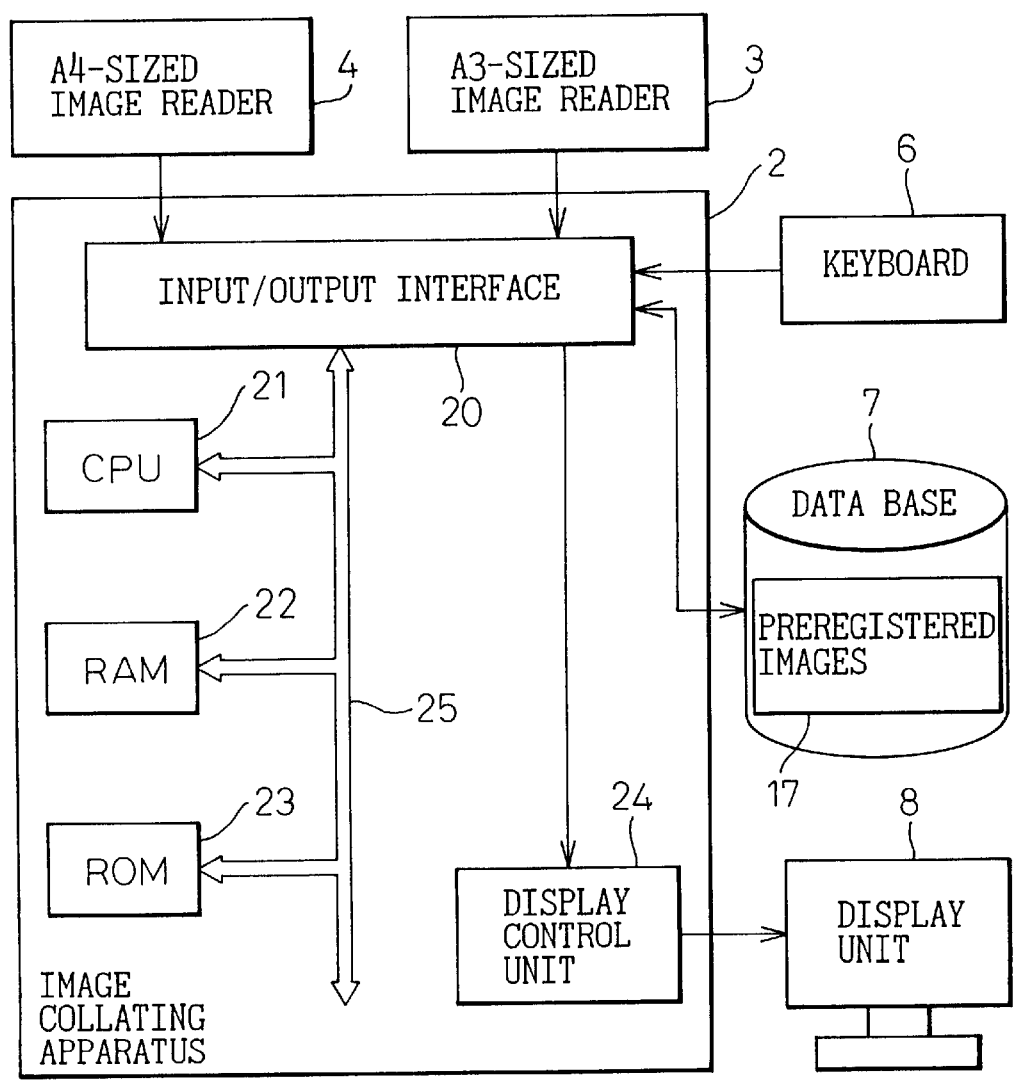
FIG. 3 is a block diagram showing a configuration of an image collating apparatus according to this invention.

FIG. 3 shows a configuration of an image collating apparatus 2 according to an embodiment of the present invention. Assume that the image input unit of this image collating apparatus 2 according to this invention is connected with a plurality of image readers having different reading sizes, for example, an A3-sized image reader 3 and an A4-sized image reader 4 as in this embodiment. The image collating apparatus 2 according to this embodiment is connected also with a keyboard 6, a data base 7 and a display unit 8.

The image collating apparatus 2 comprises an input/output interface 20, a CPU (central processing unit) 21, a RAM (random access memory) 22 and a ROM (read-only memory) 23 connected to each other by a bus 25. The A3-sized image reader 3, the A4-sized image reader 4, the keyboard 6 and the data base 7 are connected to the input/output interface 20. The display unit 8 is connected to the input/output interface 20 through a display control unit 24 in the image collating apparatus 2. Further, the data base 7 is supplied with the transfer application forms to be collated, for example, the transfer application forms issued by the neighboring municipalities for paying public utilities charges such as city gas, water and electricity, through the A3-sized image reader 3 or the A4-sized image reader 4 or the keyboard and preregistered as an image 17.

First, an explanation will be given of a first embodiment in which the image 17 preregistered in the data base 7 is the image of the whole application form.

Figure 4:
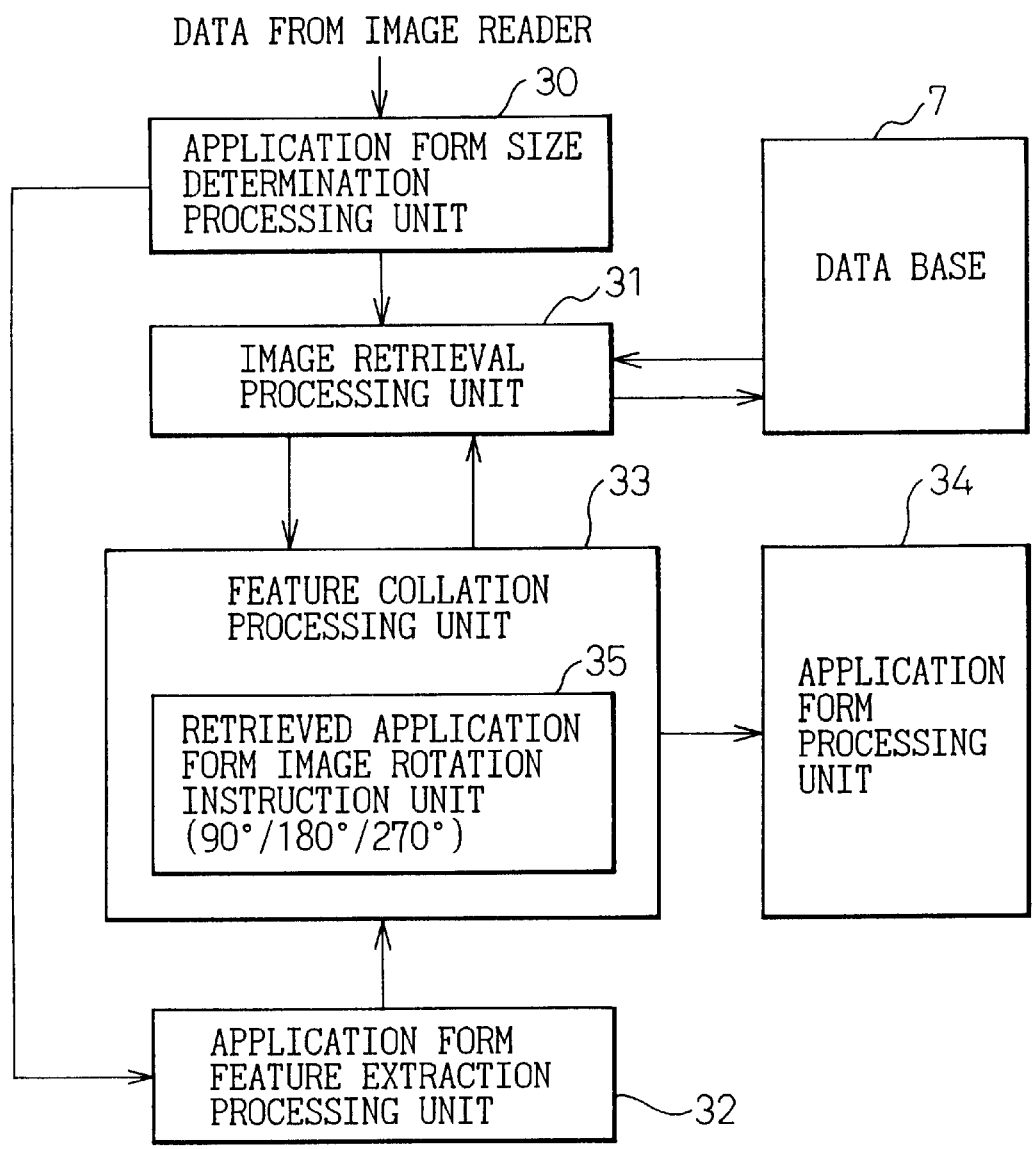
FIG. 4 is a function block diagram showing the functions, in blocks, of the image collating apparatus of FIG. 3.

FIG. 4 is a function block diagram for the image collating apparatus 2 shown in FIG. 3. An application form size determination processing unit 30 is supplied with the image data read by a plurality of image readers and determines the size of an application form based on the image data read and input thereto. From the application form size determination processing unit 30, a determined size of the application form is sent to an image retrieval processing unit 31 while, at the same time, sending the input image data to a feature extraction processing unit 32. An image retrieval processing unit 31 accesses the data base 7 and reads at least one of the application form images preregistered in the data base 7.

The image retrieval processing unit 31 retrieves and processes the preregistered image read out in accordance with the size of the application form input from the application form size determination processing unit 30. The preregistered image includes data on the feature of the application form, which data is sent to the feature collation processing unit 33. The application form feature extraction processing unit 32 extracts the feature portion of the application form from the read image data from the application form size determination processing unit 30, and sends it to the feature collation processing unit 33. The feature collation processing unit 33 collates the feature portion of the application form input from the application form feature extraction processing unit 32 with the feature portion of the application form input from the image retrieval processing unit 31, and in the case where the two feature portions coincide with each other, sends the preregistered image and the read image to the application form processing unit 34, while in the case of non-coincidence, a similar processing is performed for the next preregistered application form image. Based on the data contained in the preregistered image, the application form processing unit 34 reads the data such as the amount of paid money from the read image and thus performs the required processing.

In the case where the feature portion of the application form input from the application form feature extraction processing unit 32 fails to coincide with the feature portions of all the application forms input from the image retrieval processing unit 31, on the other hand, the rotation instruction unit 35 included in the application form feature collation processing unit 33 for rotating the retrieved application form image outputs an rotate instruction to the image retrieval unit 31, so that the preregistered image of the whole of the application forms sequentially read from the first one is retrieved after being rotated by 180 degrees, for example. The retrieved preregistered images rotated by 180 degrees are compared sequentially with the read image.

In the case where all the retrieved preregistered images of all the whole application forms rotated 180 degrees and retrieved fail to coincide with the read image, the retrieved application form image rotate instruction unit 35 outputs a rotate instruction again to the image retrieval processing unit 31, so that the image retrieval processing unit 31 retrieves the preregistered image of the read whole application form after rotating it by 90 degrees, for example, followed by the collation processing similar to the one described above. In the case where all the retrieved application form images still fail to coincide with the read image, the retrieved application form image rotate instruction unit 35 outputs a rotate instruction again to the image retrieval processing unit 31, so that the image retrieval processing unit 31 retrieves the preregistered image of the read whole application form after rotating it by 270 degrees, for example, followed by the collation processing similar to the one described above. In the case where the coincidence is not attained even after this processing, it indicates that the application form that has been read cannot be processed by the image collating apparatus under consideration.

The operation of collating the application form by the image collating apparatus 2 described above will be explained with reference to a more specific example below.

(1) Application Form Size Extraction Processing

The image 10 of the application form 1 read by the A3-sized image reader 3 has been explained with reference to FIG. 1B. All the three vouchers (A, B, C) are contained in the application form image 11. The whole of this application form 1 cannot be read by the A4-sized image reader as explained with reference to FIG. 2A. The image 10A of the application form A with the upper left corner thereof in contact with the guide 5 has been explained with reference to FIG. 2B, and includes the black background 9 and the application form image 11S. The image 10B of the upside-down application form 1 that has been read with the right lower corner of the application form C in contact with the guide 5 has been explained with reference to FIG. 2C, and includes the black background 9 and the application form image 11T.

Depending on the type of the application form 1, the voucher A or the voucher C is more important. Whichever voucher is more important, however, can be read as required by the two reading methods described above.

The voucher C of the application form 1 may be read by the A4-sized image reader 4 of FIG. 2A with the voucher A extended out over the left side of the guide 5. In this method, however, the application form 1 may fail to be set in position by the guide 5 and is liable to be fed diagonally. The diagonal feeding of the application form 1 can be prevented by bringing the upper left corner of the application form 1 into contact with the guide 5, thereby realizing image collation high in accuracy. For this reason, to read the voucher C with the voucher A extended out over the left side of the guide deteriorates the collation accuracy and is not recommended.

According to this embodiment, in order to extract the full application form size, the image 10A read by the A4-sized image reader as shown in FIG. 2B is processed as follows.

Figure 5:
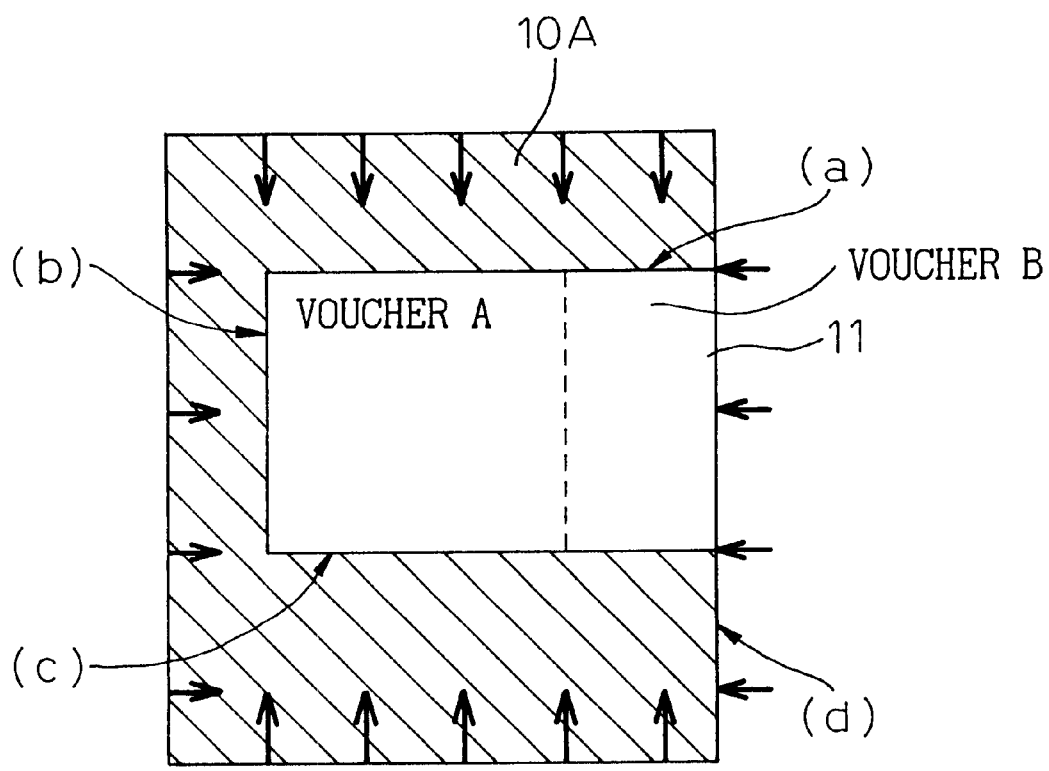
FIG. 5 is a diagram for explaining the scanning of the image of a transfer application form read by the A4-sized image reader.

(A) The image that has been read is scanned inward from the four directions as shown in FIG. 5.

(B) The point with the greatest number of scanning lines in a given direction changing from black to white pixels is determined as the coordinate of an end of the application form.

Specifically, as the result of scanning inward from top, the coordinate of an end of the application form is determined as (a); as the result of scanning inward from left, the coordinate of an end of the application form is determined as (b); as the result of scanning inward from bottom, the coordinate of an end of the application form is determined as (c); and as the result of scanning inward from right, the coordinate of an end of the application form is determined as (d).

In the case where the right end of the voucher B is extended out of the read image 10A as described above, the image end constitutes the end of the application form. In the case where the application form 1 is read by the A3-sized image reader 3, on the other hand, the read image 10 (FIG. 1B) has the black background 9 in the four directions of the application form image 11, and therefore the coordinates of the ends of the application form are extracted by scanning in the four directions.

Figure 6:
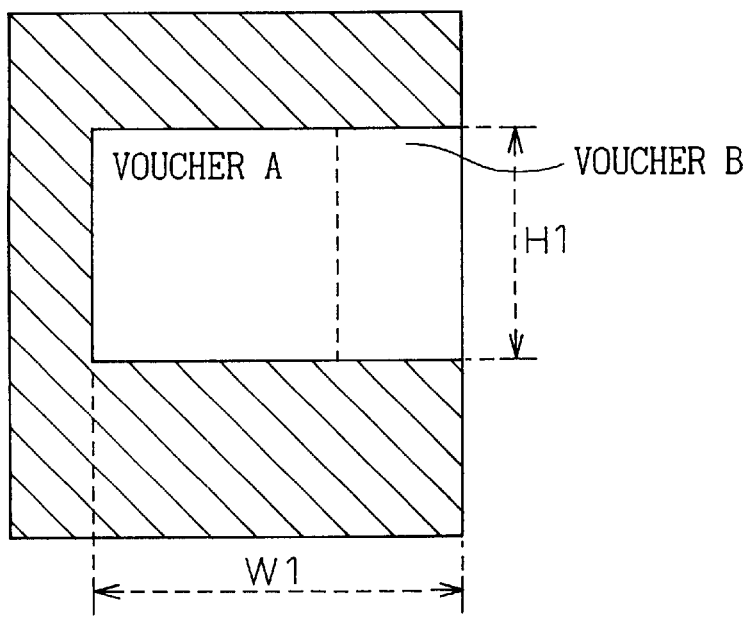
FIG. 6 is a diagram for explaining the image of the application form read by the A4-sized image reader.

(C) Consequently, the size of the application form read by the A4-sized image reader 4 from the coordinates of the ends of the application form can be determined as follows, as shown in FIG. 6.

Figure 7:
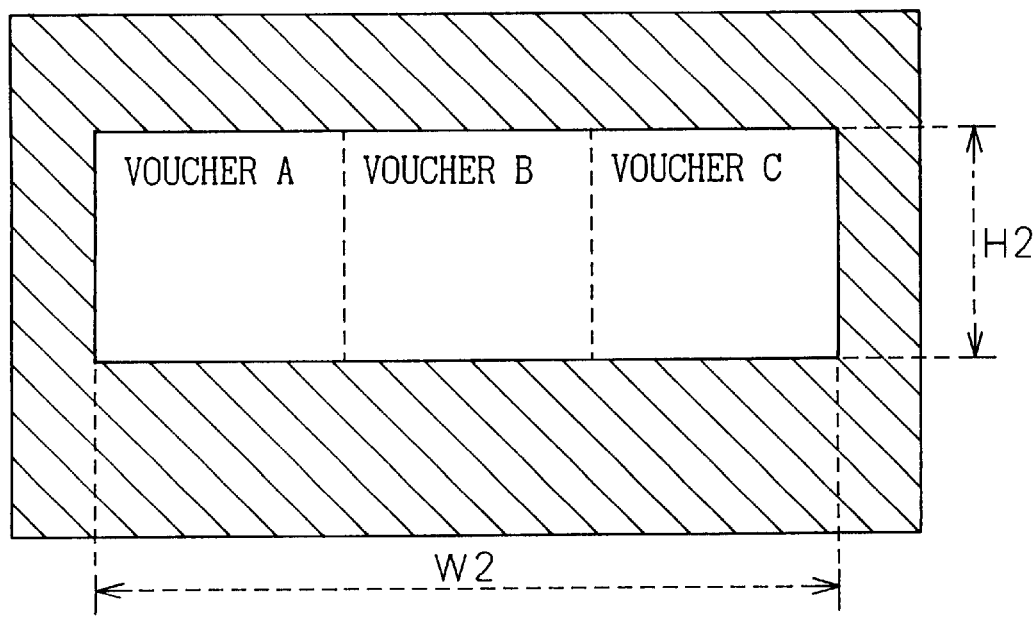
FIG. 7 is a diagram for explaining an A3-sized image preregistered in the data base of the image collating apparatus according to this invention.

Vertical length: $H1=(c)-(a)$
Horizontal length: $W1=(d)-(b)$ (2) Production of Retrieved Image The preregistered image is known to be A3 in size having the vertical length of H2 and the horizontal length of W2 as shown in FIG. 7, while the image that has been read is known to be A4 in size having the vertical length of Hi and the horizontal size of W1 from the extraction processing of the application form described with reference to FIG. 5. The A4-sized image that has been read is shown in FIG. 6. These two images are used for matching and the result of comparison between the two sizes is described below.

Height comparison: $H1=H2$
Width comparison: $W1<W2$

Figure 8A:
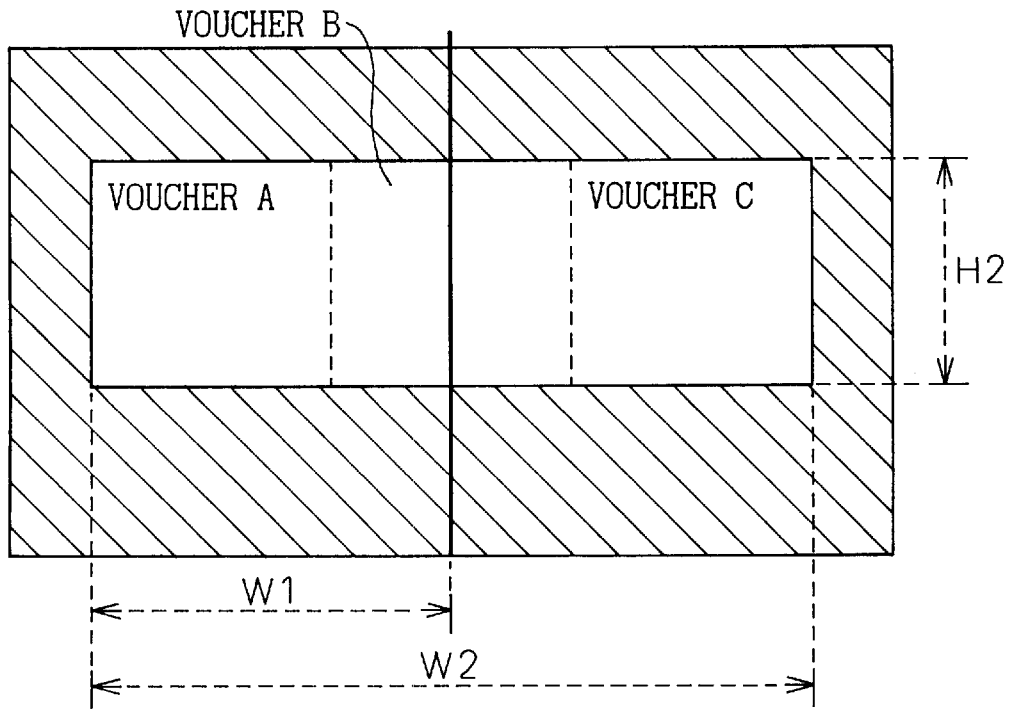
FIG. 8A is a diagram showing a preregistered image before segmentation.
Figure 8B:
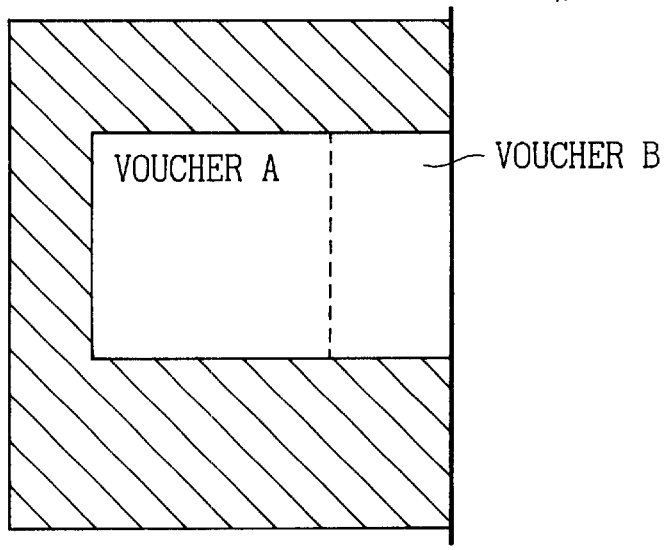
FIG. 8B is a diagram showing an image retrieved after being segmented.

Based on this result, the A3-sized image of FIG. 7 is segmented at the position of the application form designated by thick solid line shown in FIG. 8A, and the A4-sized image portion is retrieved as shown in FIG. 8B. Thus, the A4-sized image that has been read as shown in FIG. 6 is collated with the retrieved and preregistered image shown in FIG. 8B, thereby making it possible to identify the type of the application form.

(3) Extraction of Application Form Feature

In collating the A4-sized read image shown in FIG. 6 with the retrieved registered image shown in FIG. 8B, the features of the application forms are extracted and collated with each other. The features of the application form extracted for collation include the ruled line information and the character information.

(3-1) Extraction of Ruled Line Information

A ruled line is defined as a uniformly wide continuation of black pixels having a length not less than a predetermined threshold value vertically or horizontally in the read image. The coordinates (X, Y) at which the ruled line starts and ends are regarded as a feature of a particular application form. FIG. 9A is a diagram for explaining the extraction of the ruled line information. An explanation will be given of the case in which three vertical ruled lines and five horizontal ruled lines have been extracted as the result of the ruled information extraction processing.

In this case, the starting coordinate and the ending coordinate of each ruled line extracted are determined. The starting coordinate of the ruled line is located at the upper end of the ruled line, and the ending coordinate of the ruled line is located at the lower end of the ruled line. Also, the starting coordinate of the horizontal ruled line is located at the left end of the ruled line, while the ending coordinate of the horizontal ruled line is located at the right end of the ruled line.

After determining the starting and ending coordinates of the vertical and the horizontal ruled lines in this way, the coordinate information of the vertical and horizontal ruled lines are compared with each other thereby to extract the meeting points of the ruled lines which are added to the features of the application form. As shown in FIG. 9B, nine types of meeting points are extracted for the vertical and horizontal ruled lines. The meeting points determined from the relation between the vertical and horizontal ruled lines in terms of the nine types of meeting points described above are indicated by black circles in FIG. 9C. The number of meeting points and the meeting point information are extracted as the features of the application form image that has been read.

(3-2) Extraction of Character Information

A mass of black pixels having a size with a predetermined threshold value is extracted as label information making up a character, and used as a feature of the application form. The character information used as the feature include the extracted character arrangement and the number of characters (total number of characters or the number of continuous characters).

FIGS. 10A to 10C are diagrams for explaining the extraction of character information. From the read image of the application form as shown in FIG. 10A, a mass of black pixels making up a character (label information) corresponding to the predetermined threshold size is extracted as shown in FIG. 10B. In the case under consideration, the mass of black pixels making up the ruled lines are deleted as it is larger than the predetermined threshold value size.

Then, in order to extract the feature further from the state of FIG. 10B, the extraction of the feature character label is limited to large characters. After deleting the characters having a predetermined threshold size smaller than a predetermined value, the character information as shown in FIG. 10C is obtained. From this result, the feature character information to the effect that the number of characters is 13 and the starting/ending coordinates (X, Y) of each character are extracted.

(4) Matching Application Form Features

The extracted feature information of the image that has been read in the above-mentioned way and the preregistered image are compared with each other.

For each type of feature, the ratio which the number of coincident features represents of the total number of features, for example, the sum of the number of vertical ruled lines and the number of horizontal ruled lines in the case of the ruled line information, is calculated. In the case where the total sum of the ratios exceeds a predetermined threshold value, it is determined that the two images are coincident with each other.

In this way, the image that has been read and the preregistered image are collated with each other.

(5) Rotation Processing of Application Form Image (5-1) 180-Degree Rotation Processing Even after the collation in the way described above, an image that has been read may fail to coincide with any one of the images preregistered in the data base. In such a case, the image of the application form that has been read may not have been input in the data base. In almost all such cases, however, the non-coincidence is caused by the fact that the application form is not read in normal position by the A4-sized image reader.

Figure 11A:
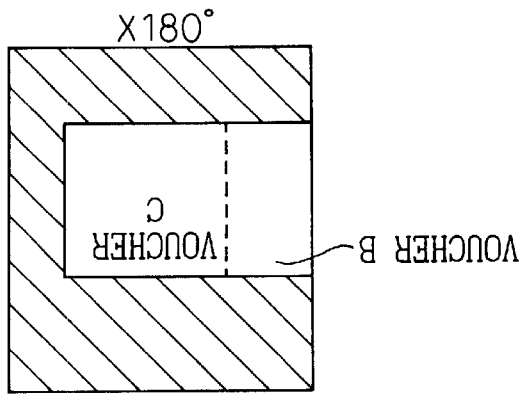
FIG. 11A is a diagram showing an image of an application form in an upside-down position read by the A4-sized image reader.
Figure 11B:
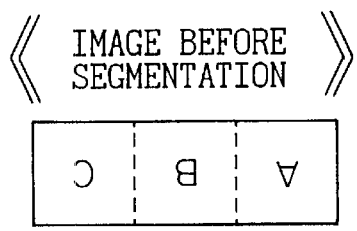
FIG. 11B is a diagram showing the state in which a preregistered image of the application form has been rotated by 180 degrees from the position shown in FIG. 11A.
Figure 11C:
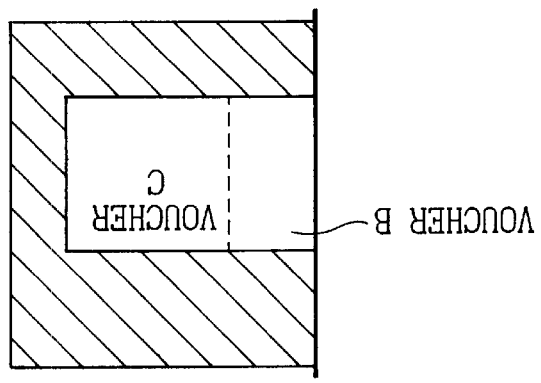
FIG. 11C is a diagram showing an image retrieved from a preregistered image in accordance with the position of the application form.

In view of this, according to this invention, in the case of incoincidence as the result of matching the features, as shown in FIG. 11A, it is determined that the application form has been read upside down by the image reader, and the process returns to the processing for producing a retrieved image. The application form read upside down is rotated by 180 degrees. In such a case, therefore, the preregistered A3-sized image explained with reference to FIG. 7 is rotated by 180 degrees as shown in FIG. 11B. In the retrieved image production process of (2), the retrieved image as shown in FIG. 11C is produced, and the process of (3) and (4) is executed again to match the features.

By this 180-degree rotation processing of the image, the image that has been read coincides with the preregistered image in almost all cases.

(5-2) Rotation Processing at Other Angles

Even after processing the preregistered image by rotation of 180 degrees, the image that has been read may totally fail to coincide with the images preregistered in the data base. In such a case, the application form rotated 90 or 270 degrees from the normal upright position may have been read by the A4-sized image reader.

Figure 12A:
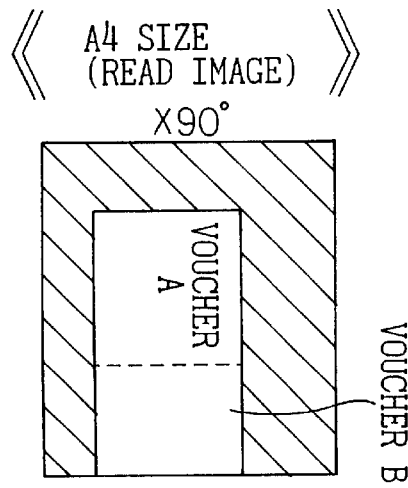
FIG. 12A is a diagram showing an image of the A4-sized application form rotated 90 degrees from the normal upright position, which is read by the A4-sized image reader.
Figure 12D:
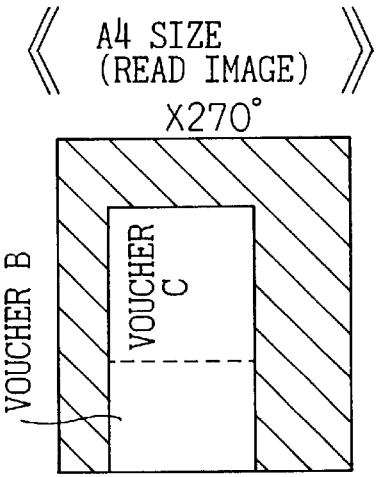
FIG. 12D is a diagram showing an image of the application form rotated 270 degrees from the normal upright position, which is read by the A4-sized image reader.

In view of this, according to this invention, in the case of non-coincidence after matching the features taking whether the application form is in a normal upright position or an upside-down position into consideration, the retrieved image production processing is executed for the two cases, i.e. the case in which the application form has been read by the image reader by being rotated 90 degrees from the normal upright position as shown in FIG. 12A and the case in which the application form has been read by the image reader in a position rotated 270 degrees from the normal upright position as shown in FIG. 12D.

Figure 12B:
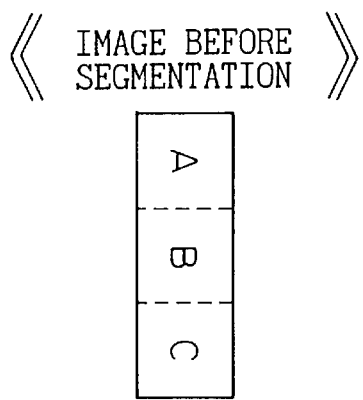
FIG. 12B is a diagram showing a preregistered image of the application form rotated 90 degrees from the position shown in FIG. 12A.
Figure 12E:
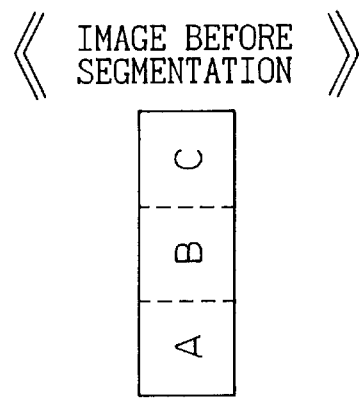
FIG. 12E is a diagram showing a preregistered image of the application form rotated 270 degrees from the position shown in FIG. 12D.
Figure 12C:
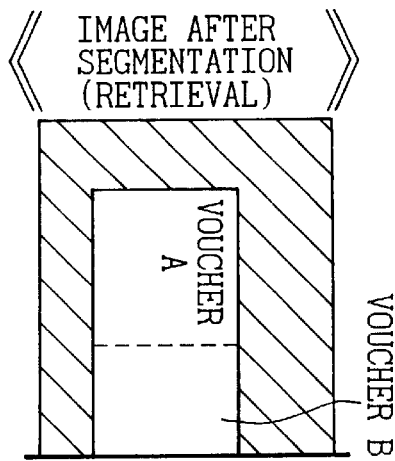
FIG. 12C is a diagram of an image retrieved from a preregistered image in accordance with the position of the application form.

Specifically, first, it is determined that the application form has been read in a position 90 degrees rotated from the normal upright position, and the preregistered A3-sized image explained with reference to FIG. 7 is rotated by 90 degrees as shown in FIG. 12B. Then, in the retrieved image production process of (2), the retrieved image as shown in FIG. 12C is produced, and the features are matched by executing the process of (3) and (4) again.

Figure 12F:
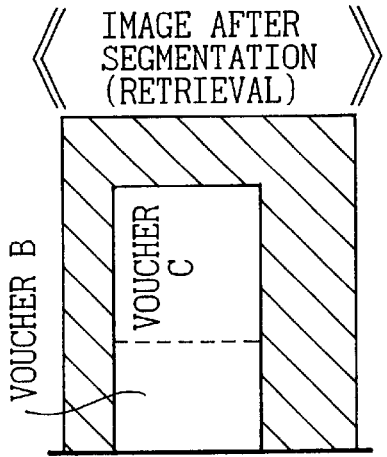
FIG. 12F is a diagram showing an image retrieved from a preregistered image in accordance with the position of the application form.

In the case of non-coincidence even after matching the features, first, it is determined that the application form has been read by rotating 270 degrees from its normal upright position, and the preregistered A3-sized image explained with reference to FIG. 7 is rotated by 270 degrees as shown in FIG. 12D. Then, the retrieved image is produced as shown in FIG. 12F in the retrieved image production process of (2), followed by the repeated execution of the process of (3) and (4) to match the features.

In the case where the image that has been read and the image preregistered in the data base fail to coincide with each other even after the 180-degree rotation of the preregistered image and the subsequent rotation of 90 degrees and 270 degrees, it indicates that the image that has been read is not included in the images preregistered in the data base or that the machine is defective. The present invention is not applicable to these cases.

The process of the collating method for the image collating apparatus 2 according to an embodiment of the invention operating as described above will be explained with reference to flowcharts.

Figure 13A:
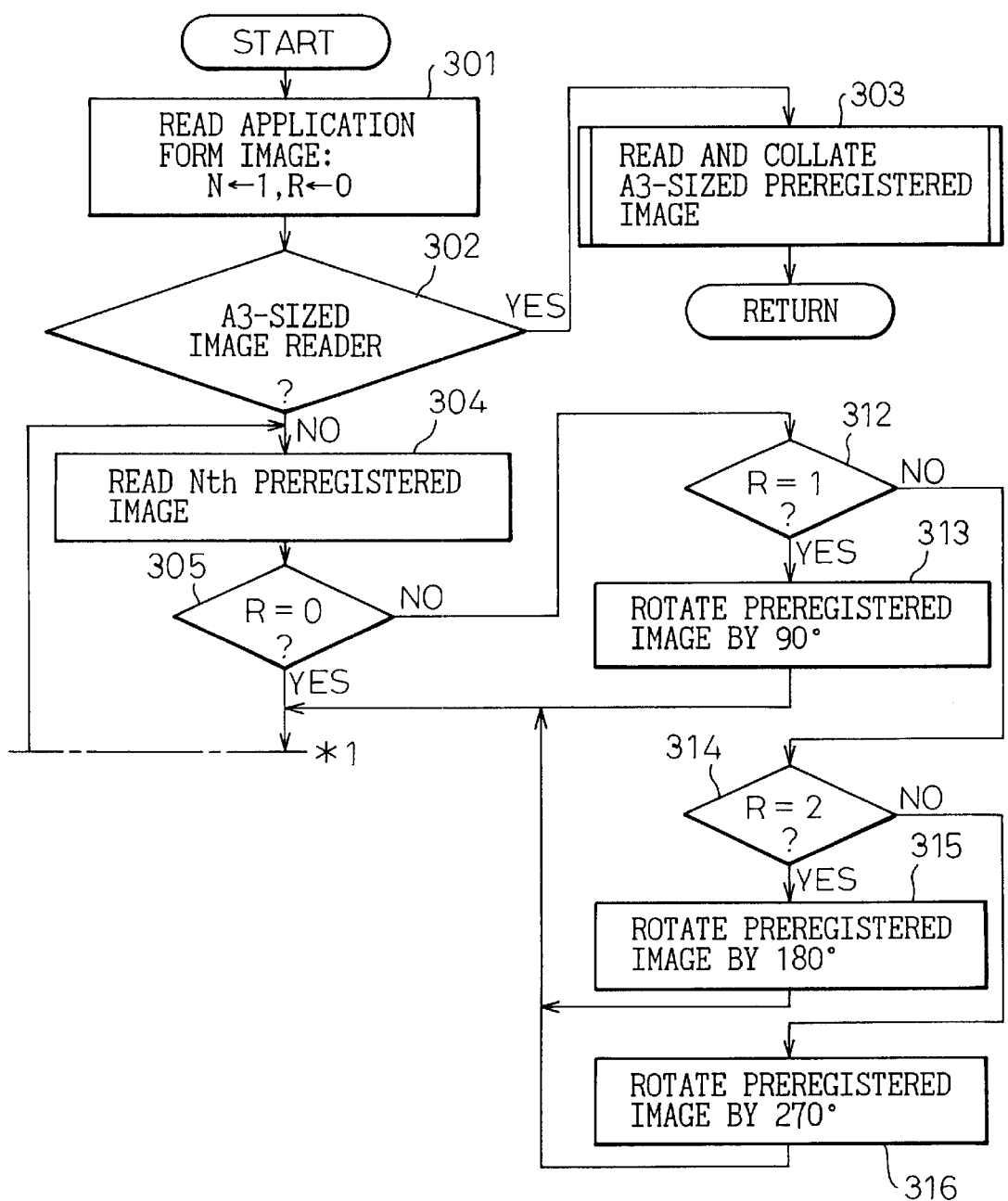
FIGS. 13A and 13B are flowcharts showing the process of operation of the image collating apparatus for an A3-sized preregistered image.
Figure 13B:
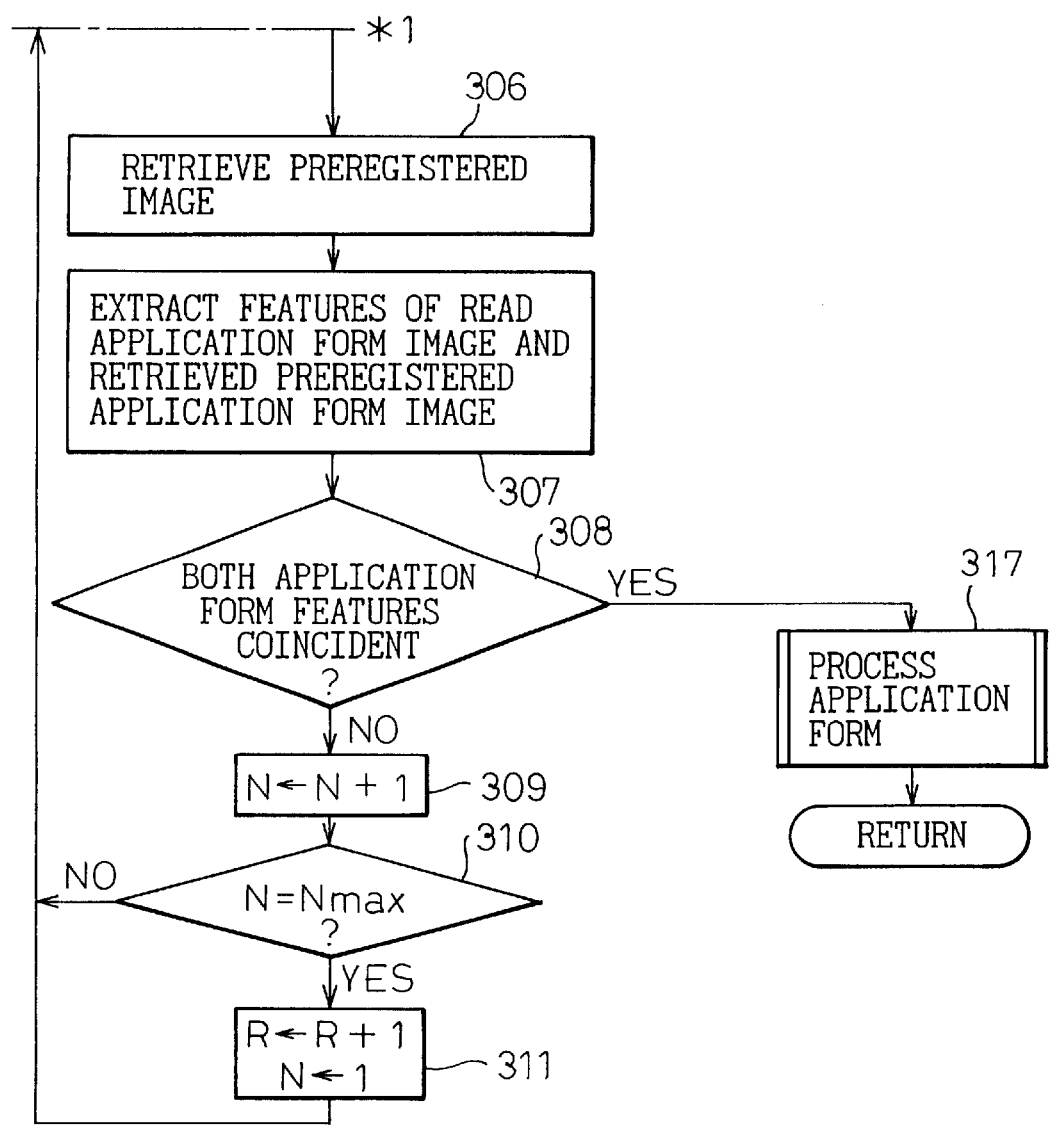

FIGS. 13A and 13B show the process performed by the collating method for the image collating apparatus 2 for the A3-sized preregistered image. When the application form is placed on the image reader and the read start button of the image reader is depressed, this process is started.

In step 301, the processing for reading the application form is performed by the image reader. The read number N of the image preregistered in the data base is set to the initial value 1, while at the same time setting the rotation flag R indicating whether the preregistered image is to be rotated or not to the initial value 0 (the rotation is not effected). In the next step 302, it is determined whether the image reader that has read the application form is of an A3 type (indicated as A3 type in the drawing) or not.

In the case where the image reader that has read the application form is of an A3 type, the process proceeds to step 303 where the preregistered A3-sized images are sequentially read and collated with the image of the application form read by the image reader. In this case, the size of the application form read by the image reader coincides with the size of the image preregistered in the data base, and therefore the application form image read by the image reader may simply be collated sequentially with one preregistered image to another read from the data base. In the case where the application form image read by the image reader fails to coincide with the preregistered images sequentially read from the data base, the preregistered images read from the data base are rotated by 180 degrees and the same operation is performed. Then, the application form image, except when not preregistered in the data base, coincides with a preregistered image (In the case of the A3-sized image reader, it is assumed that the application form is not rotated by 90 or 270 degrees). In the case of coincidence, the application form is normally processed in accordance with the information of the preregistered image coinciding with the application form image and this routine is finished. Therefore, the collation in this case will not be further described.

In the case where the image reader that has read the application form is not of A3 type but of A4 type described with reference to FIG. 6, on the other hand, the process proceeds to step 304. In step 304, the Nth preregistered image is read from the data base. When the process first proceeds to this step 304, the first preregistered image is read from the data base. The preregistered image read from the data base is of A3 size as explained with reference to FIG. 7.

In step 305, it is determined whether the value of the rotation flag R is 0 or not. The rotation flag R is set to 0 in step 301, and therefore the determination in step 305 is affirmative. As a result, the process proceeds to step 306 while the preregistered image read from the data base is kept in the same state. In step 306, the A3-sized preregistered image read from the data base is retrieved and processed in accordance with the size of the read A4-sized image as explained with reference to FIGS. 8A, 8B. Thus, the A4-sized read image and the preregistered image of the application form assume the same size.

In the next step 307, as explained with reference to FIGS. 9A to 9C and 10A to 10C, the features of the application form image and the preregistered image retrieved in A4 size are extracted. In the next step 308, it is determined whether the features of the application form are coincident between the two images. In the case where the features of the two application form images are coincident, the process proceeds to step 317, in which the application form is normally processed in accordance with the information of the preregistered image coincident with the application form image that has been read, thus terminating this routine.

In the case where the size of the A4-sized read image of the application form and the size of preregistered image fail to be coincident with each other in step 308, on the other hand, the process proceeds to step 309, so that the read number N of the image preregistered in the data base is incremented by one. In the next step 310, it is determined whether the incremented read number N of the preregistered image is the maximum value Nmax of the registration number in the data base or not. In the case where the read number N of the preregistered image is not the maximum value Nmax, the process returns to step 304, in which the collation process of steps 304 to 308 described above is repeated for the preregistered image of the next read number N. The collation process performed by incrementing the read number N of the preregistered image by one in step 309 is continued until the read application form image comes to coincide with the preregistered image in step 308 or the determination in step 310 turns affirmative.

In the case where the read number N of the preregistered image incremented in step 309 coincides with the maximum value Nmax of the number preregistered in the data base in step 310, the process proceeds to step 311. In step 311, it is determined that the A4-sized read image of the application form has failed to coincide with the preregistered image in normal upright position, and 1 is added to the value of the rotation flag R while at the same time restoring the read number N of the preregistered image read from the data base to the initial value of 1, followed by returning to step 304. In this case, R=1 indicates the process of rotating the preregistered image by 180 degrees.

After passing step 311 in this way, the determination in step 305 following the reading of the preregistered image in step 304 turns negative. In that case, the process proceeds to step 312 to determine whether the value of the rotation flag R is 1 or not. In the case where the value of the rotation flag R is 1, the process proceeds to step 313, and the preregistered image read in step 304 is rotated by 180 degrees and returns to step 306. This process, as explained with reference to FIG. 11A, assumes that the application form placed in normal upright position is read by the image reader. The preregistered image rotated by 180 degrees assumes the state described with reference to FIG. 11B.

After returning to step 306, as in the process described above, the preregistered image is retrieved in step 306, and the features of the read application form image and the application form of the retrieved preregistered image are extracted in step 307, after which the collation and determination are carried out in step 308. In the case of noncoincidence, the process returns to step 304 through steps 309 and 310. After that, the process of steps 304 to 310 plus the process of steps 312 to 313 is continued until the determination in step 308 or the determination in step 310 turns affirmative.

After executing the determination process described above, the image read by the image reader coincides with the preregistered image in almost all cases. In the case where the read number N of the preregistered image coincides with the maximum value Nmax of the registration number in the data base in step 310, the process proceeds again to step 311 where 1 is added to the rotation flag R. At the same time, the read number N of the preregistered image read from the data base is restored to the initial value of 1, followed by returning to step 304. In this case, the image of the application form read by the image reader may be neither in a normal upright position nor an upside-down position, and is considered to be in the state rotated 90 degrees described in FIG. 12A or in the state rotated 270 degrees explained with reference to FIG. 12D. In this case, R=2 indicates that the image has been rotated by 90 degrees, and R=3 indicates that the image has been rotated by 270 degrees.

According to this embodiment, in the case where the image of the application form read by the image reader fails to coincide with the image retrieved from the registered image, regardless of whether the value of the rotation flag R is 0 or 1, the value of the rotation flag R is further incremented to R=2 and a similar processing is executed. Also, in the case where the image of the application form read by the image reader fails to coincide with the retrieved image that has been read, regardless of whether the rotation flag R assumes any of the values of 0 to 2, the value of the rotation flag R is further incremented to R=3, and a similar process is performed. Further, in the case where the image of the application form read by the image reader fails to coincide with the retrieved image that has been preregistered, regardless of whether the rotation flag R assumes any of the values of 0 to 3, it is determined that the image of the application form read by the image reader does not exist in the images preregistered in the data base.

In the case where the value of the rotation flag R is incremented to 2 in step 311, the determination in the subsequent step 305 turns negative, followed by the determination in step 312 also turning negative, and the process proceeds to step 314, in which the determination turns affirmative, followed by proceeding to step 315. In step 315, as explained with reference to FIG. 12B, the preregistered image read in step 304 is rotated by 90 degrees in step 315, followed by returning to step 306. After returning to step 306, the process of steps 306 to 308 is carried out as in the process described above. In the case where the read image of the application form fails to coincide with the preregistered image thereof as the result of the collation determination in step 308, the process returns to step 304 through steps 309 and 310. After that, the process of steps 312, 314 and 315 plus the process of steps 304 to 310 are continued until the determination in step 308 or step 310 becomes affirmative.

In the case where the value of the rotation flag R is incremented to 3 in step 311, the determination in the subsequent step 305 turns negative, followed by the determination in step 312 also turning negative, and the process proceeds to step 314, in which the determination turns negative and the process proceeds to step 316, followed by proceeding to step 315. In step 316, as explained with reference to FIG. 12E, the preregistered image read in step 304 is rotated by 270 degrees, followed by returning to step 306. After returning to step 306, the process of steps 306 to 308 is carried out as in the process described above. In the case where the read image of the application form fails to coincide with the preregistered image thereof as the result of the collation determination in step 308, the process returns to step 304 through steps 309 and 310. After that, the process of steps 312, 314 and 316 plus the process of steps 304 to 310 are continued until the determination in step 308 or step 310 becomes affirmative.

As described above, according to this embodiment, regardless of the direction in which the application form is placed in the A4-sized image reader, the data read by the A4-sized image reader can be collated with the A3-sized data preregistered in the data base.

Figure 14A:
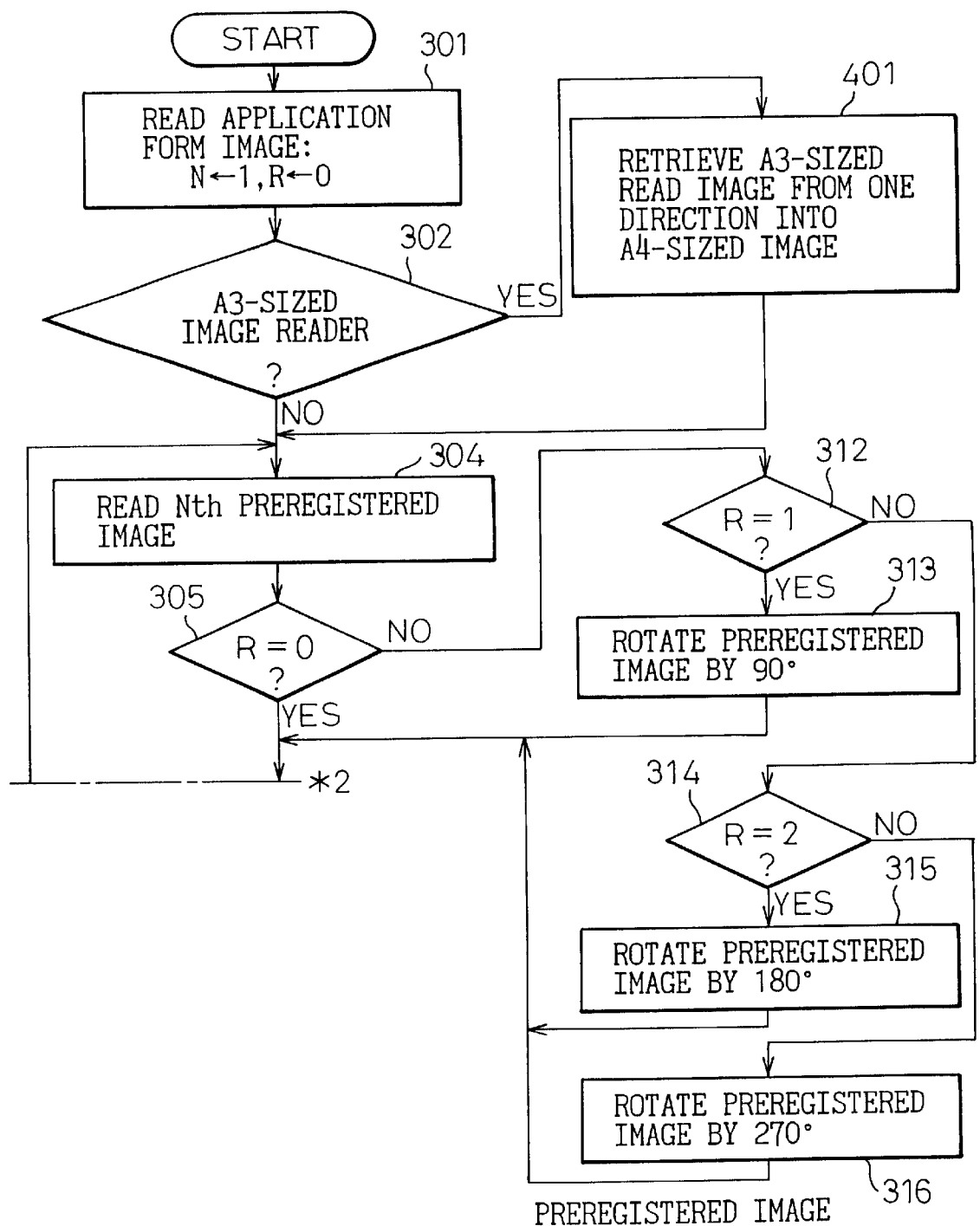
FIGS. 14A and 14B are flowcharts showing the process of operation of the image collating apparatus for an A4-sized preregistered image.
Figure 14B:
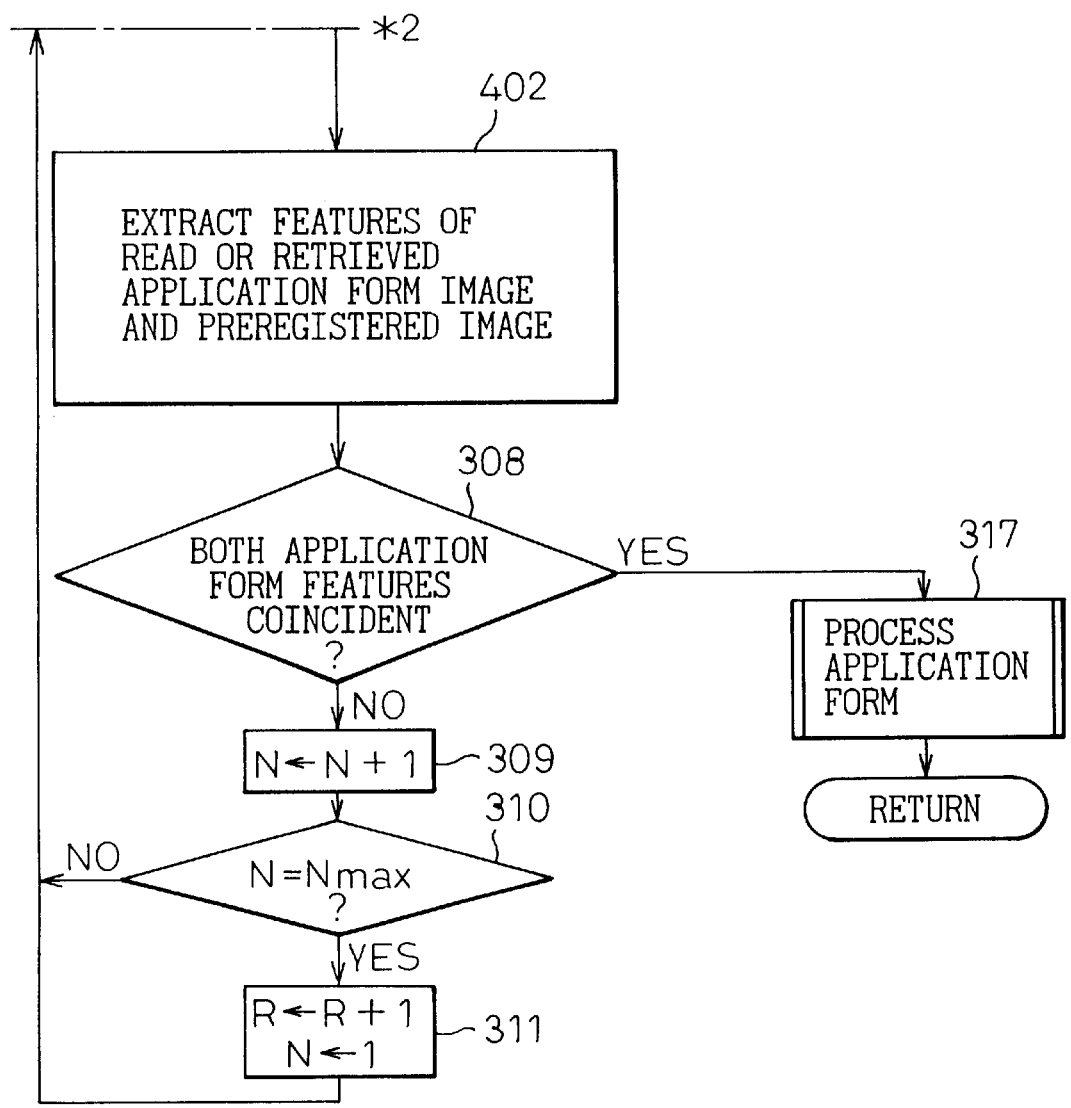

FIGS. 14A and 14B are flowcharts showing the process of operation of the image collating apparatus according to this invention performed in the case where the preregistered image is A4 in size. Also according to this embodiment, when the read start button of the image reader is depressed with the application form placed on the image reader, the process is started. In the case where the preregistered image is A4 in size, the process of the operation of the image collating apparatus is similar in many points to that of the image collating apparatus for the A3-sized preregistered image, and therefore the explanation will be simplified by attaching the same numerals to the same steps, respectively.

Also, in the case where the preregistered image is A4 in size, the application form is read by the image reader in step 301, and the read number N of the preregistered image is set to the initial value of 1. At the same time, the rotation flag R of the preregistered image is set to the initial value of 0. In the next step 302, it is determined whether or not the image reader that has read the application form is of A3 type (indicated as A3 type in the drawing).

In the case where it is determined in step 302 that the image reader that has read the application form is of A3 type, the size of the image that has been read is larger than that of the preregistered image, and therefore the size of the image that has been read is required to be set to the size of the preregistered image. In this case, therefore, the process proceeds to step 401 for retrieving the A3-sized read image, after which the process proceeds to step 304. The A3-sized read image is retrieved from one predetermined direction. As a result of this retrieval process, the image read by the A3-sized image reader comes to assume the same size as the image read by the A4-sized image reader. Also, in the case where it is determined in step 302 that the image reader that has read the application form is of an A4 type, the size of the read image coincides with that of the preregistered image. In this case, therefore, the process proceeds to step 304.

As in the embodiment described above, after the Nth preregistered image is read from the data base in step 304, it is determined in step 305 whether the value of the rotation flag R is 0 or not. Also, the process of steps 312 to 316, i.e. the process of rotating the preregistered read image, executed in the case where the value of the rotation flag R is not 0 in step 305 is the same as the corresponding process in the embodiment described above. Thus, the description that follows refers only to the case where the value of the rotation flag R is 0.

In the case where it is determined in step 305 that the value of the rotation flag R is 0, the process proceeds to step 402. In step 402, the features of the application form image read by the A4-sized image reader or the image retrieved and read by the A3-sized image reader are extracted, while at the same time extracting the feature of the preregistered image. In the next step 308, it is determined whether the features of the two application forms are coincident with each other or not. In the case where the features of the two application forms coincide, the process proceeds to step 317, so that the application form is normally processed in accordance with the preregistered image information coincident with the application form image that has been read, and this routine is terminated.

In the case where the feature of the A4-sized application form image read in step 308 fails to coincide with the feature of the preregistered application form image, on the other hand, the process proceeds to step 309, in which the read number N of the image preregistered in the data base is incremented by one. In the next step 310, it is determined whether or not the incremented read number N of the preregistered image is the maximum value Nmax of the registration number in the data base. In the case where the read number N of the preregistered image is not the maximum value Nmax, the process returns to step 304 for repeating a similar collation process for the preregistered image having the next read number N. In the case where the read number N of the preregistered image coincides with the maximum value Nmax of the registration number in step 310, on the other hand, the process proceeds to step 311. In step 311, 1 is added to the value of the rotation flag R while the read number N of the preregistered image read from the data base is restored to the initial value of 1, followed by a return to step 304.

Once the process of step 311 is passed in this way, the determination in step 305 after the process of reading the preregistered image in step 304 turns negative, and after the preregistered image is rotated in steps 312 to 316, a similar process of collation and determination is executed.

As described above, according to this embodiment, regardless of the direction in which the application form is placed in the A4- or A3-sized image reader, the data read by the image reader can be collated with the A4-sized data preregistered in the data base.

Although the embodiments described above refer to the transfer application form, the present invention is not specifically limited to the collation of the transfer application form but effectively applicable to other documents.

It will thus be understood from the foregoing description that unlike the conventional method in which the matching of the same document between the read image and the preregistered image having different sizes requires the pre-registration of both images in this invention, in contrast, the whole or a part of either the A4- or A3-sized application form can be matched by the image reader as long as one of the image sizes is preregistered.

Also, the collation with the preregistered image is possible regardless of the direction in which the application form is placed on the image reader.

What is claimed is:

1. An image collating apparatus for sequentially collating the image of a document read by an image reader with a plurality of document images preregistered in a data base and determining the type of said document by detecting the coincidence between the images, comprising:

a plurality of image readers having different read sizes connected to an image input unit;

a preregistered image read circuit for sequentially reading the document images preregistered in the data base;

a document size determination processing circuit for detecting the document ends from the document image input from said image readers and determining the document size;

an image retrieval circuit for setting the size of said read document to the size of the preregistered image by retrieving said read preregistered image in accordance with the read document size in the case where the read document size is smaller than said preregistered document size, and by retrieving said read document image from one direction in accordance with the size of said preregistered image in the case where the read document size is larger than the size of said preregistered image;

a feature extraction processing circuit for extracting the document feature from the document image set to said preregistered image in size by said image retrieval circuit;

a feature collation processing circuit for sequentially matching the extracted document feature with the feature of the preregistered image set to said document image in size by said image retrieval circuit; and a document determination circuit for determining the type of the document based on said preregistered image in the case where the document feature coincides with the feature of the preregistered image.

2. An image collating apparatus according to claim 1, wherein said document is a transfer application form used for paying taxes and public utilities charges.

3. An image collating apparatus according to claim 2, wherein said feature collation processing circuit collates the feature of the transfer application form by extracting the ruled line information and the character information.

4. An image collating apparatus according to claim 3, wherein said feature collation processing circuit extracts the starting coordinate and the ending coordinate of the vertical and horizontal ruled lines from said ruled line information, extracts the meeting points of the ruled lines from said coordinate information of the vertical and horizontal ruled lines, and collates the feature of the application form by use of the number of the meeting points and the coordinates thereof.

5. An image collating apparatus according to claim 3, wherein said feature collation processing circuit extracts the character arrangement and the number of characters from said character information and collates the feature of the transfer application form by use of said character arrangement and said number of characters.

6. An image collating apparatus according to claim 1, further comprising a preregistered image rotating circuit wherein the preregistered image read by said preregistered image reading circuit is rotated by a multiple of 90 degrees and sent to said image retrieval circuit in the case where said feature collating processing circuit fails to attain coincidence between the feature of the document and the feature of all the preregistered images read from said data base.

7. An image collating method for an image collating apparatus for sequentially collating the image of a document read by an image reader with a plurality of document images preregistered in a data base and determining the type of the document by detecting the coincidence between the images, wherein said apparatus includes an image input unit connected to a plurality of image readers of different reading sizes, said method comprising the steps of:

sequentially reading the document images preregistered in said data base at the time of determining the document type;

determining the document size by detecting the document ends from the document image input from said image readers;

retrieving said read preregistered image in accordance with said read document size in the case where the read document size is smaller than the size of said preregistered image, and retrieving said read document image from one direction in accordance with the size of said preregistered image in the case where said read document size is larger than the size of said preregistered image;

extracting the document feature from said document image;

sequentially matching and collating the extracted document feature with the feature of said preregistered image; and determining the type of the document from the preregistered image in the case where the document feature coincides with the feature of said preregistered image.

8. An image collating method according to claim 7, wherein said document is a transfer application form used for paying taxes and public utilities charges.

9. An image collating method according to claim 7, wherein the feature extracted in said feature extraction step include the ruled line information and the character information.

10. An image collating method according to claim 9, wherein the starting coordinate and the ending coordinate of the vertical and horizontal ruled lines are extracted from said ruled line information and the meeting points of the ruled lines are extracted from the coordinate information of the vertical and horizontal ruled lines in said feature extraction step, and the extracted feature of the application form is sequentially matched with the feature of said preregistered image by use of the number of the meeting points and the coordinates thereof in said feature collating step.

11. An image collating method according to claim 9, wherein the character arrangement and the number of characters are extracted from said character information and the meeting points of the ruled lines are extracted from the coordinate information of the vertical and horizontal ruled lines in said feature extraction step, and the extracted feature of the application form is matched sequentially with the feature of the preregistered image by use of said character arrangement and the number of characters in said feature collating step.

12. An image collating method according to claim 7, further comprising the image rotation step for causing said image retrieval step to be executed after rotating said preregistered image or said read image by a multiple of 90 degrees in the case where the feature of the document fails to coincide with the features of all the preregistered images read from said data base in said feature collation step.

* * * * *